United States Patent [19]

Jarrett et al.

[11] Patent Number: 4,501,244
[45] Date of Patent: Feb. 26, 1985

[54] FUEL INJECTION PUMPING APPARATUS

[75] Inventors: Boaz A. Jarrett, London; Ivor Fenne, Greenford; David F. Lakin, London; Dorian F. Mowbray, Burnham, all of England

[73] Assignee: Lucas Industries Public Limited Company, Birmingham, England

[21] Appl. No.: 509,038

[22] Filed: Jun. 29, 1983

[30] Foreign Application Priority Data

Jul. 15, 1982 [GB] United Kingdom ............... 8220492

[51] Int. Cl.³ ............................................. F02D 1/02
[52] U.S. Cl. ..................................... 123/446; 123/506
[58] Field of Search ............... 123/446, 447, 458, 459, 123/506, 494, 357

[56] References Cited

U.S. PATENT DOCUMENTS

| 4,280,464 | 7/1981 | Kanai et al. | 123/447 |
| 4,297,982 | 11/1981 | Lakra | 123/446 |
| 4,325,340 | 4/1982 | O'Neill | 123/447 |
| 4,378,775 | 4/1983 | Straubel et al. | 123/446 |
| 4,381,750 | 5/1983 | Funada | 123/446 |
| 4,385,609 | 5/1983 | Kato | 123/446 |
| 4,418,670 | 12/1983 | Lakin | 123/446 |

FOREIGN PATENT DOCUMENTS 81152 5/1982 Japan ................... 123/446

Primary Examiner—Magdalen Y. C. Moy

[57] ABSTRACT

A fuel injection pumping apparatus for supplying fuel to an internal combustion engine includes a cylinder in which is located a fluid pressure operable piston. An outlet extends from one end of the cylinder and a valve controls the flow of fuel to the one of the cylinder from a fuel source. Also provided is an engine driven cam for actuating a plunger reciprocable in a bore. A second valve controls fluid flow from the bore to the other end of the cylinder and the valve is controlled by an electromagnetic actuator. Transducer means responsive to the position of the cam provides signals to control the actuator, the amount of fuel which flows into the one end of the cylinder being represented by the angular movement of the cam.

6 Claims, 4 Drawing Figures

FUEL INJECTION PUMPING APPARATUS

This invention relates to a fuel injection pumping apparatus for supplying fuel to an internal combustion engine and of the kind comprising a fluid pressure operable piston located within a cylinder, an outlet from one end of the cylinder, first valve means through which fuel can be admitted to said one end of the cylinder, a plunger reciprocable within a bore and an engine driven cam for actuating said plunger, a passage connecting one end of said bore with the other end of said cylinder and second valve means operable to allow fluid under pressure displaced from said bore during inward movement of said plunger by the cam, to flow to said other end of the cylinder thereby to displace the piston and cause fuel flow through the outlet.

During the flow of fuel into said one end of the cylinder it is necessary to control the displacement of the piston in order that the amount of fuel delivered through the outlet at the next pumping stroke of the apparatus can be controlled.

It is known to measure the displacement of the piston and this does provide an accurate measure of the amount of fuel. The provision of a transducer to achieve this measurement does however present practical problems and the object of the invention is to provide an apparatus of the kind specified in a simple and convenient form.

According to the invention means is provided to sense the relative angular movement of the cam and plunger during the period fuel is allowed to enter said one end of the cylinder, the angular movement of the cam being representative of the axial movement of the piston.

Examples of apparatus in accordance with the invention will now be described with reference to the accompanying drawings, in which.

Figure 1:
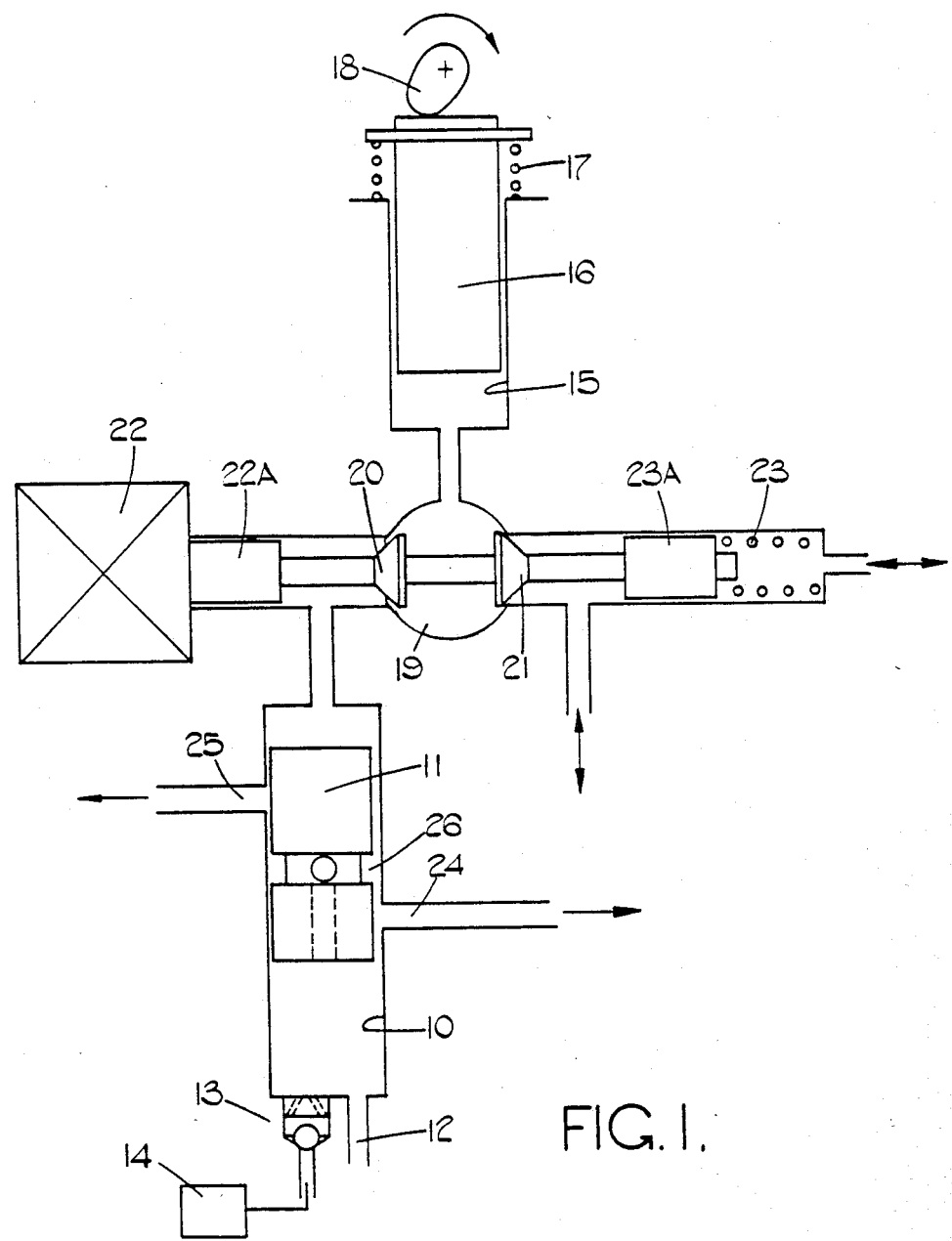
FIG. 1 is a diagrammatic representation of one example of the apparatus employing a two-way control valve.

Referring to FIG. 1 of the drawings there is provided a cylinder 10 in which is located a piston 11. One end of the cylinder is connected to an outlet 12 which in use, is connected to a fuel injection nozzle of an associated engine. The same end of the cylinder is connected by way of a non-return valve 13, to a source 14 of liquid fuel under pressure.

Also provided is a bore 15 which contains a reciprocable plunger 16, the plunger being biased in one direction by the action of a spring 17 and movable in the opposite direction by the action of a cam 18 which is carried by a cam shaft driven in synchronism with the associated engine.

The bore 15 is connected to a valve chamber 19 accommodating a pair of interconnected valve members 20, 21, the valve members being coupled to an electromagnetic actuator 22 and being biased by means of a coiled compression spring 23 so that the valve member 20 closes onto a seating and the valve member 21 is lifted from a seating. The valve member 20 controls the flow of liquid, conveniently fuel, from the valve chamber 19 into the other end of the cylinder 10 while the valve 21 controls the flow of liquid, into and out of the chamber 19. The valve members are coupled to pressure balancing pistons 22A, 23A respectively.

The cylinder 10 is provided with a pair of drain outlets 24, 25, the outlet 24 being uncovered during the pumping stroke of the piston, to a groove 26 formed on the piston and communicating with said one end of the cylinder. The port 25 is arranged to be uncovered by the end of the piston at said other end of the cylinder, the port 24 being uncovered to the groove 26 before the port 25 is uncovered.

In operation, during inward movement of the plunger 16, and with the valve member 20 lifted from its seating, fuel will flow from the chamber 19 into the other end of the cylinder 10 and will effect displacement of the piston towards said one end of the cylinder. This displacement will result in fuel flow through the outlet 12. This flow of fuel ceases when the groove 26 is uncovered to the port 24 but continued movement of the piston 11 will take place until the port 25 is uncovered. At this time movement of the piston will cease although movement of the plunger by the cam can continue. When inward movement of the plunger 16 ceases fuel flowing through the valve 13 will pressurize the fuel remaining in the one end of the cylinder 10 and this will have the effect of moving the piston 11 upwardly until the port 25 is closed. At this point and assuming of course that the plunger 16 is still at rest, the piston 11 will be hydraulically locked. There will of course occur a flow of fuel through the port 24 but such flow can be kept to a low value by suitable sizing of the port or by providing a restriction in the connection between the port and a drain.

As the cam continues to rotate, the plunger 16 will start to move under the action of the spring 17. As the valve 20 is still open, the piston 11 will follow the movement of the plunger and fuel will flow into said one end of the cylinder 10. A transducer is provided to sense the angular movement of the cam and knowing the profile of the trailing face of the cam lobe the movement of the piston and hence the amount of fuel which is drawn into the cylinder 10 will relate to the angular movement of the cam. As soon as it is determined that the required amount of fuel has flowed into the cylinder 10, the valve actuator is de-energised to permit the valve member 20 to close onto its seating and to lift the valve member 21 from its seating. Closure of the valve member 20 onto its seating will cause a hydraulic lock which will halt further movement of the piston. However, continued movement of the plunger 16 can occur, the fuel flowing into the bore 15 by way of the valve chamber 19 from for example the source 14. The plunger 16 will continue its movement under the action of the spring as allowed by the cam. As the plunger moves inwardly against the action of the spring 17, fuel will be displaced from the bore 15 and if the valve member 21 is still lifted from its seating, the fuel will be returned to the source of supply. However, if during the inward movement of the plunger 16 the valve actuator is energised, the pressurized fuel will flow into the cylinder 10 and the piston 11 will be moved to supply fuel through the outlet 12.

If the quantity of fuel which is required to be supplied by the aparatus is small and the engine speed is low, it may be convenient to delay filling of the cylinder 10 until later in the cycle as for example when the plunger 16 is approaching the limit of its outward movement. This reduces the delay between the end of metering and the start of injection and should improve the control of the engine particularly at idling speeds. In this case, the actuator is de-energised when the plunger 16 is at its innermost position. If the apparatus is operated in this manner then the valves have to be operated twice during the cycle. Nevertheless, at low engine speeds the valves should be capable of being so operated.

Figure 2:
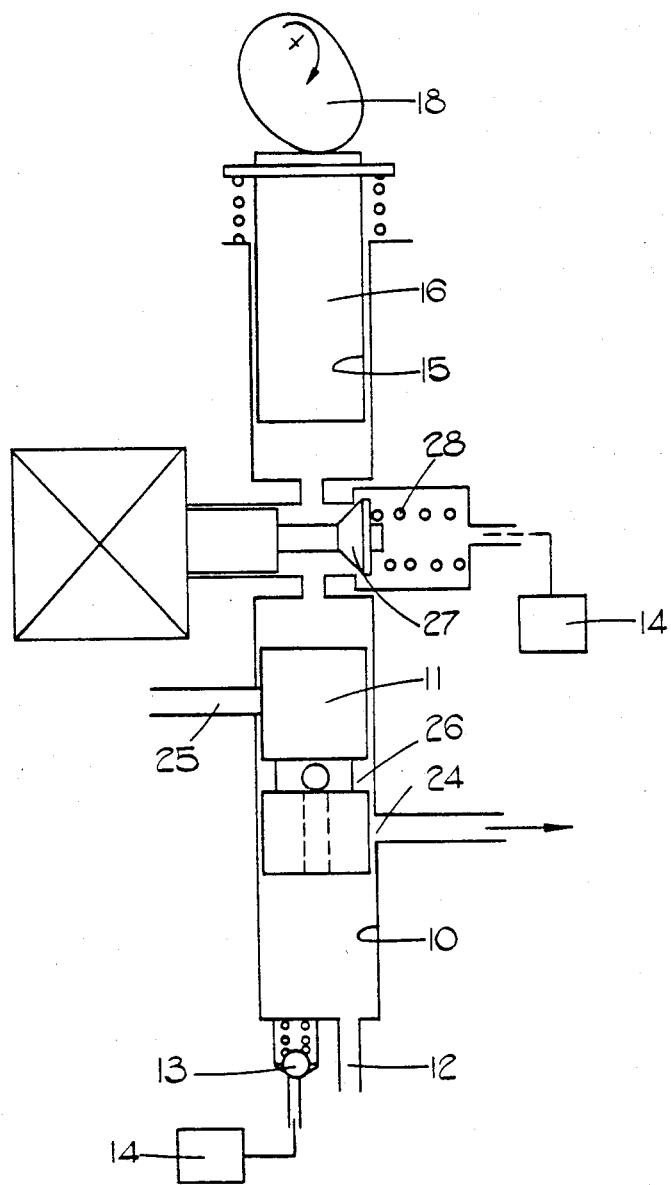
FIG. 2 is a view similar to FIG. 1 showing an apparatus employing a single-way valve.

Turning now to FIG. 2, identical reference numerals are used where possible as those shown in FIG. 1, in fact the only difference is in the construction of the valve. In this arrangement the bore 15 is connected directly with the other end of the cylinder 10 and the valve is formed by a single valve member 27 which is biased onto a seating by means of a spring 28. The valve member when open, places the connected ends of the bore 15 and cylinder 10 in communication with the source of fuel 14. In operation, during movement of the plunger 16 against the action of its spring, fuel is displaced into the cylinder 10 to cause movement of the piston as with the example of FIG. 1. Again as with the example of FIG. 1, when the port 24 is uncovered to the groove 26, flow of fuel through the outlet ceases but continued movement of the piston takes place until the port 25 is uncovered. Following this continued movement of the plunger 16 under the action of the cam can take place. Once the movement of the plunger 16 ceases the piston under the action of fuel under pressure entering the one end of the cylinder 10, moves to cover the port 25. As the cam rotates outward movement of the plunger 16 takes place and this is accompanied by movement of the piston 11. Once again the angular movement of the cam is measured and once it has been determined that sufficient angular movement has taken place, the valve member 27 is lifted from its seating. This has the effect of applying fuel under pressure to the other end of the cylinder 10 from the source 14 and since the valve 13 will cause a slight pressure drop, the piston 11 is brought to rest. Outward movement of the plunger 16 can however continue to take place. After the plunger 16 has started to move inwardly, at the appropriate instant the valve member 27 is allowed to close onto its seating so that the fuel in the connected ends of the cylinder and bore is pressurized to cause movement of the piston 11 and delivery of fuel through the outlet 12.

As with the example of FIG. 1, when the quantity of fuel which is being supplied by the apparatus is very small, it may be preferable to delay the supply of fuel to the one end of the cylinder 10 until the plunger 16 has more or less completed its outward movement.

Figure 3:
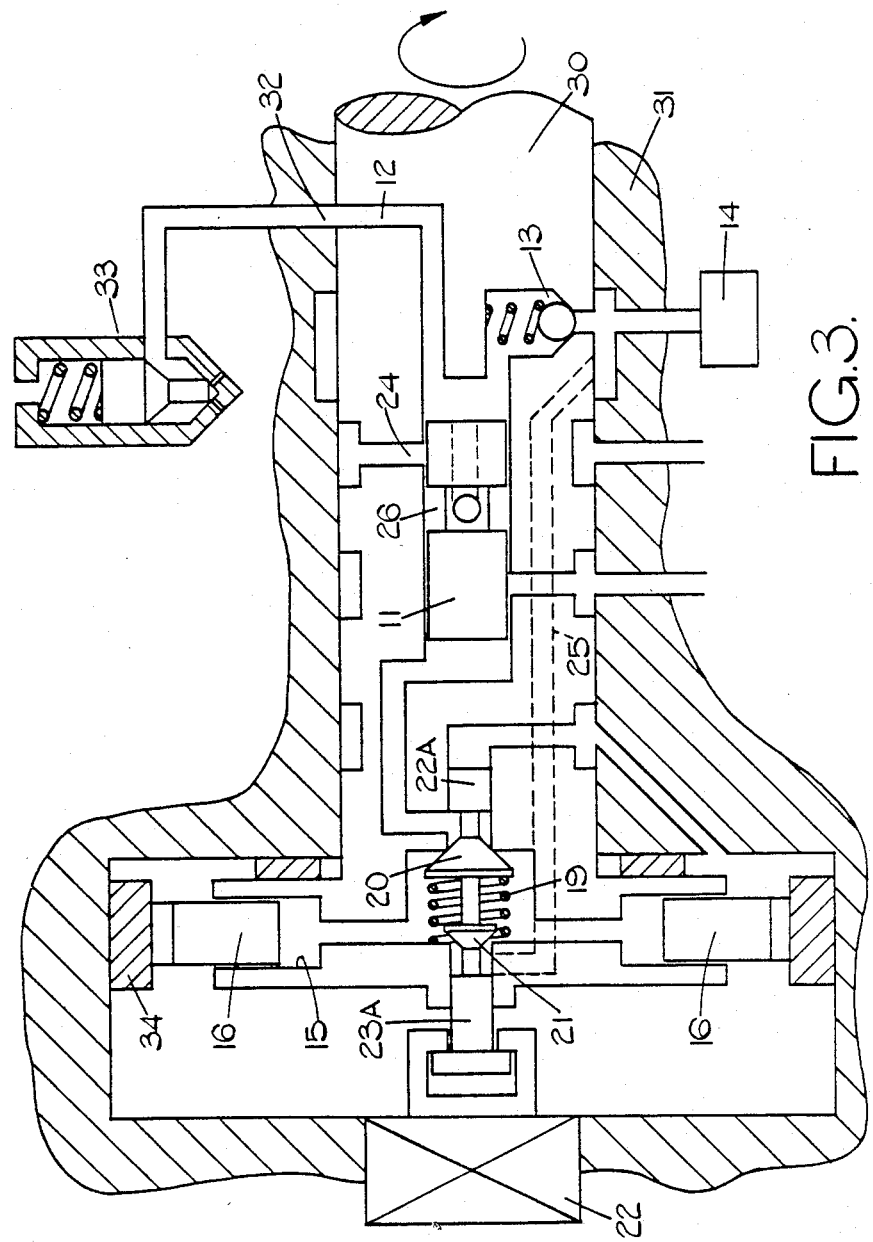
FIG. 3 is a diagram of a rotary distributor form of pumping apparatus in accordance with the invention.

Turning now to FIG. 3 the apparatus illustrated therein is a rotary distributor fuel injection pumping apparatus which incorporates the arrangement described with reference to FIG. 1. The components of the apparatus which have the same function of the apparatus of FIG. 1 are therefore provided with the same reference numerals. Referring to FIG. 3, there is provided a rotary distributor member 30 which is housed in a surrounding body 31 and which is adapted to be driven in timed relationship with an associated engine. The outlet passage 12 constitutes a delivery passage and is adapted to register in turn as the distributor member rotates, with a plurality of outlets 32 formed in the body and connected respectively to the injection nozzles 33 of the associated engine. Only one outlet 32 and one injection nozzle 33 is shown. The apparatus for the purpose of achieving a balance of the forces acting on the distributor member incorporates a pair of plungers 16 these being disposed in diametrically opposed bores 15, which communicate with the valve chamber 19 as in the example of FIG. 1. The cam referenced 34, is as is conventional in distributor pumps, non-rotatably mounted within the body and has a plurality of diametrically disposed pair of cam lobes for effecting inward movement of the plungers 16. The plungers 16 as is conventional practice, are actuated by rollers which engage the cam lobes and contrary to the arrangement shown in FIG. 1, the plungers are not spring loaded. The sequence of operation of the apparatus corresponds with that of FIG. 1 and the plungers 16 are moved outwardly by transfer of fuel upon movement of the piston 11, when the valve member 21 is on its seating. When it is determined that the required displacement of the piston 11 has taken place, in this case by measuring the angular displacement of the distributor member, the actuator is de-energised and the valve member 20 moves onto its seating, lifting the valve member 21 from its seating. In this situation the bores 15 are connected to the source of fuel 14 and the plungers 16 are urged outwardly by fuel pressure.

Figure 4:
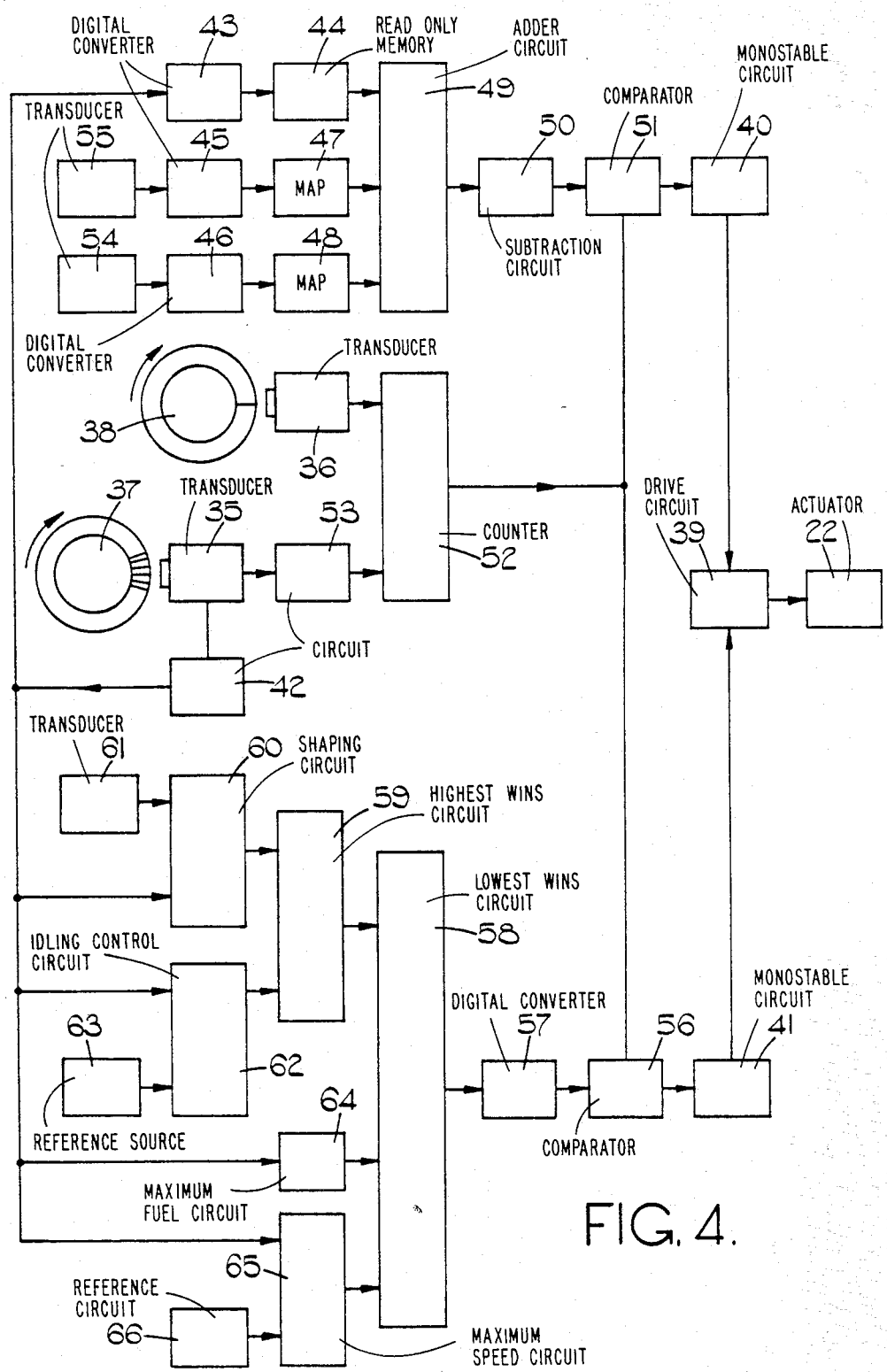
FIG. 4 is a block diagram of a control system for use with the apparatus.

In FIG. 4 there is shown in block form a control system which is intended for use with the apparatus shown in FIG. 1. The control system comprises transducers 35, 36 which are responsive to marks provided on a pair of discs or wheels 37, 38 respectively. The wheels are connected to the camshaft 18 of the associated engine and the wheel has one mark cut in it such that the transducer 36 produces a signal when the appropriate engine cylinder is at bottom dead centre. The other wheel 37 has a plurality of equiangularly spaced marks so that signals are produced by the transducer at regular intervals as the engine rotates.

The actuator 22 is supplied with electric current by means of a drive circuit 39 which is of the latch variety. The drive circuit 39 which is turned on by a pulse supplied by a monostable circuit 40, remains in this condition until turned off by means of a pulse supplied by a monostable circuit 41.

The monostable circuit 40 is controlled by a timing circuit which is comprised of the series of blocks shown in the upper portion of the diagram. The timing circuit receives an analogue speed signal from a circuit 42 which receives the signals provided by the transducer 35. This speed signal is supplied to an analogue to digital converter 43 and from the converter to a map 44 in the form of a Read Only Memory 44. The memory 44 contains a record of desired timing of fuel delivery over the range of engine speeds. Further analogue to digital converters 45, 46 translate the fuel quantity signal and the engine temperature signal from analogue to digital form and these signals are supplied to maps 47, 48 respectively which contain information similar to the map 43 but relative to fuel quantity and engine temperature. The outputs of the maps are added together in an adder circuit 49 to give the required injection timing. This value is subtracted in the subtraction circuit 50 from 180° to give a code for injection timing after bottom dead centre. The output of the subtraction circuit 50 is compared in a comparator 51 with the output of a counter 52. This counter is reset by the pulse provided by the transducer 36 and counts engine degree signals provided by a circuit 53 which receives the signals from the transducer 35.

The comparator 51 compares the signals provided by the subtraction circuit 50 and the counter 52 and when the signals are equal provides an output which is supplied to the monostable circuit 40. The latter generates a pulse to turn the drive circuit on. The timing of the start of fuel delivery therefore depends upon the engine speed, the amount of fuel being supplied to the engine and the temperature of the engine. The temperature of the engine is monitored by a transducer 54 and the engine fuel signal by a transducer 55. The latter may however be omitted and the fuel signal obtained from a further portion of the circuit to be described. It will of course be understood that other engine operating parameters can be taken into consideration.

The actuator 22 is switched on and off once every four strokes of the respective piston in a four stroke engine. In the case of a two stroke engine the wheel 38 would be driven by the engine crankshaft.

The monostable circuit 41 is controlled by a comparator 56 and this determines the point during the filling cycle at which the actuator 22 is de-energised to prevent further movement of the piston 26. The comparator 56 is supplied with a signal from a fuel determining network.

The comparator 56 receives the signal from the counter 52 and also a signal from an analogue to digital converter 57 which in turn receives the output of a lowest wins circuit 58. The circuit 58 receives a number of input signals and selects the one which will give the least amount of fuel. The first such input is provided by a highest wins circuit 59 which itself has two inputs one of which is supplied by a shaping circuit 60. This circuit receives the engine speed signal from the circuit 42 and also a demand signal from a transducer 61 associated with the throttle control of the engine. The other input to the circuit 59 is provided by an idling control circuit 62 which receives the engine speed signal and also a reference signal from a reference source 63.

The second input to the circuit 58 is provided by a maximum fuel circuit 64 which contains stored information relating to the maximum amount of fuel which can be supplied to the engine at various engine speeds.

The third input to the circuit 58 is provided by a circuit 65 which is provided with the engine speed signal and also a signal from a reference source 66 indicative of the allowed maximum engine speed.

In operation at engine idling speeds the circuit 62 is operative to determine the demanded fuel signal at the output of the circuit 58 since with no demand on the part of the operator, the output from the circuit 62 will be larger than the output from the shaping circuit 60 but smaller than the output of the circuit 64 and the maximum speed circuit 65. When the operator places a demand on the engine by depressing the throttle pedal, then the output of the shaping circuit 60 becomes higher than the output of the circuit 62. If only a small demand is made then the signal from the circuit 59 will still be lower than those provided by the circuit 64 and the circuit 65. Hence the driver will control directly the amount of fuel supplied to the engine and with an increased flow of fuel the engine will accelerate. If the operator makes a larger demand on the engine then it is likely that the output of the circuit 59 will be greater than the output of the circuit 64 in which case the rate of fuel supply will be controlled by the circuit 64 until the output of the circuit 59 becomes smaller thereby restoring the control of the fuel supply to the operator. If the maximum allowed engine speed is reached then the output of the circuit 65 will be the smallest signal and the fuel supply to the engine will be reduced to control the speed of the engine. The shaping circuit 60 is arranged to modify the apparent demanded fuel in accordance with increases in the engine speed to provide feedback to the operator of the engine. Furthermore, the idling speed may be modified in accordance with variation in low fuel demand on the part of the operator. This provides a smooth transition from the control by the circuit 62 to the control by the circuit 60 and eliminates "lost motion" in the operator adjustable control.

The actuator 22 is de-energised when the signals provided by the counter 52 and the converter 57 are equal. Flow of fuel into the cylinder 10 only takes place when the plunger 16 starts to move under the action of the spring 17 that is to say when the trailing face of the cam 18 is engaged by the plunger. The amount of fuel which flows into the cylinder 10 is therefore completely unaffected by any variation in the timing of fuel delivery. The rate of supply of fuel to the bore 10 from the source 14 during the filling period, is determined by the profile of the trailing flank of the cam. The filling period can therefore extend over a substantial number of degrees of rotation of the cam to achieve very accurate metering.

The governor circuit may be modified in many ways to provide for example, a change in the idling speed with engine temperature, modification of the maximum fuel delivery in accordance with the ambient air pressure and/or temperature, modification of the maximum fuel delivery with the pressure in the air inlet manifold of the engine, additional fuel for starting the engine when cold and modification of the fuel level for starting when the engine is hot.

It will be understood that the circuit of FIG. 4 may be replaced by an all speed governor circuit or an isochronous governor circuit.

If pilot injection of fuel is required this may be effected by modifying the timing circuit to provide an initial energisation of the solenoid device 22 followed by de-energisation thereof and re-energisation to achieve the main injection of fuel.

We claim:

1. A fuel injection pumping apparatus for supplying fuel to an internal combustion engine of the kind comprising a fluid pressure operable piston located within a cylinder, an outlet from one end of the cylinder, first valve means through which fuel can be admitted to said one end of the cylinder, a plunger reciprocable within a bore, an engine driven cam for actuating said plunger, a passage connecting one end of said bore with the other end of said cylinder, second valve means operable to allow fluid under pressure displaced from said bore during inward movement of said plunger by the cam, to flow to said other end of the cylinder thereby to displace the piston and cause fuel flow through the outlet, and means for sensing the relative angular movement of the cam and plunger during the period fuel is allowed to enter said one end of the cylinder, the angular movement of the cam being representative of the axial movement of the piston.

2. An apparatus according to claim 1 including transducer means for providing signals representative of the angular position of the cam.

3. A fuel injection pumping apparatus for supplying fuel to an internal combustion engine of the kind comprising a fluid pressure operable piston located within a cylinder, an outlet from one end of the cylinder, first valve means through which fuel can be admitted to said one end of the cylinder, a plunger reciprocable within a bore, an engine driven cam for actuating said plunger, a passage connecting one end of said bore with the other end of said cylinder, second valve means operable to allow fluid under pressure displaced from said bore during inward movement of said plunger by the cam, to flow to said other end of the cylinder thereby to displace the piston and cause fuel flow through the outlet, and transducer means for sensing the relative angular movement of the cam and plunger during the period fuel is allowed to enter said one end of the cylinder, the angular movement of the cam being representative of the axial movement of the piston, said transducer means providing signals representative of the angular position of the cam and comprising a pair of discs driven in synchronism with said cam, a pair of transducers for sensing markings on said discs respectively and for providing electrical signals corresponding to said markings as the discs rotate, one of said discs having a mark or markings corresponding to a particular engine position or positions and the other disc having a larger number of equiangularly spaced markings.

4. An apparatus according to claim 3 including a counter for counting the signals produced by the transducer associated with said other disc, said counter being reset by the signal provided by the transducer associated with said one disc, the count value of said counter representing the position of said cam relative to said engine position.

5. An apparatus according to claim 4 including a timing circuit operable to determine the required timing of delivery of fuel, a first comparator for comparing the count value of said counter and the required timing of fuel delivery, said comparator when said values correspond producing a first control signal, the apparatus including a fuel determining network, a second comparator for comparing the count value of said counter and the quantity of fuel required, said second comparator providing a second control signal when the values correspond, and means responsive to said first and second control signals for controlling the operation of said second valve means.

6. An apparatus according to claim 5 including an electromagnetic actuator for said second valve means, a latched power circuit for supplying electric current to said actuator, said first and second control signals controlling the operation of said power circuit, said first control signal causing opening of said second valve means and said second control signal causing closure of said second valve means.

* * * * *